United States Patent [19]
Montigny et al.

[11] Patent Number: 5,531,812
[45] Date of Patent: Jul. 2, 1996

[54] IMPREGNATING EMULSION FOR MINERAL BUILDING MATERIALS

[75] Inventors: Armand de Montigny, Leverkusen; Hermann Kober; Bernd Klinksiek, both of Bergisch Gladbach; Ottfried Schlak, Köln, all of Germany

[73] Assignee: Bayer Aktiengesellschaft, Leverkusen, Germany

[21] Appl. No.: 402,404

[22] Filed: Mar. 10, 1995

Related U.S. Application Data

[63] Continuation of Ser. No. 210,218, Mar. 18, 1994, abandoned.

[30] Foreign Application Priority Data

Mar. 26, 1993 [DE] Germany ................... 43 09 971.8

[51] Int. Cl.⁶ .................. C04B 41/49; C08J 3/03; C09D 183/04
[52] U.S. Cl. .................. 106/2; 106/287.14; 106/287.13; 252/311
[58] Field of Search ............... 252/311; 106/2, 106/287.14, 287.13

[56] References Cited

U.S. PATENT DOCUMENTS

| | | | |
|---|---|---|---|
| 4,486,476 | 12/1984 | Fritsch et al. | 427/387 |
| 4,778,624 | 10/1988 | Ohashi et al. | 252/312 |
| 4,874,547 | 10/1989 | Narula | 106/287.14 |
| 5,091,002 | 2/1992 | Schamberg et al. | 106/2 |
| 5,196,054 | 3/1993 | Schmuck et al. | 106/287.14 |

FOREIGN PATENT DOCUMENTS

| | | |
|---|---|---|
| 0157323 | 10/1985 | European Pat. Off. . |
| 0234024 | 9/1987 | European Pat. Off. . |
| 0285725 | 10/1988 | European Pat. Off. . |
| 0340816 | 11/1989 | European Pat. Off. . |
| 0436431 | 7/1991 | European Pat. Off. . |
| 1592569 | 7/1981 | United Kingdom . |

*Primary Examiner*—Melissa Bonner
*Attorney, Agent, or Firm*—William C. Gerstenzang; Sprung Horn Kramer & Woods

[57] ABSTRACT

Waterproofing agents for mineral building materials based on aqueous emulsions of organo-silanes and/or organosiloxane resins containing reactive groups in which the disperse phase has an average particle size of 0.55 to 1.1 μm and a scope of particle size range of less than 1.3.

5 Claims, 1 Drawing Sheet

IMPREGNATING EMULSION FOR MINERAL BUILDING MATERIALS

This application is a continuation of application Ser. No. 08/210,218, filed on Mar. 18, 1994, now abandoned.

BACKGROUND OF THE INVENTION

The present invention relates to an aqueous impregnating emulsion free of organic solvents, which penetrates deeply into dense as well as porous building materials and provides them with good hydrophobic properties, and is also effective in the case of neutral substrates without catalyst.

It is based on mixtures of suitable hydrolyzable and condensable alkoxy-functional silicon resins as well as alkyl alkoxy silanes.

A range of aqueous preparations is known, which had been developed for the hydrophobic impregnation of porous building materials. However, these are associated with a number of disadvantages, which are explained in more detail below:

If the building materials are especially dense, then all the resin-based preparations generally fail with respect to penetration depth, even if they have a relatively low molecular weight. An example of this is provided by the preparations known from EP-A-157 323. They provide the surface of porous building materials with excellent hydrophobic properties with adequate penetration depth. However, in the case of dense building materials, although the surfaces are indeed made hydrophobic, the penetration depth is inadequate. This only provides a time-limited protection against harmful effects from water in such building materials.

Aqueous emulsions of alkyl alkoxyl silanes are preferably used where good penetration depths are required in the case of dense building materials. Such preparations are known, for example, from DE-A-27 51 714, EP-A-234 024 and EP-A-340 816.

Although these preparations, in principle, have acceptable penetrating capacity, they lead to inadequate surface hydrophobia in practice, as demonstrated by heavy wetting during rain showers. Moreover, the desired penetration depth is frequently not achieved. The reasons for this are as follows:

The somewhat problematic stability of the alkyl alkoxyl silanes in emulsion causes condensation products to form, which on the one hand—because of the degree of condensation—are no longer able to penetrate sufficiently deeply, and on the other hand, are not (yet) able to ensure a high degree of surface hydrophobia. If large quantities of buffer substances are added to the emulsions—to prevent premature hydrolysis and to ensure adequate storage stability—, this also affects the desired hydrolysis subsequent to application, since both hydrolysis and condensation—above all in neutral building materials—are greatly inhibited. In particular at summer temperatures, this causes the silanes to evaporate before hydrolysis and condensation can occur. An attempt to counteract this problem by using highly concentrated emulsion leads to wastage of the generally high-quality silanes.

According to DE-A-33 12 911, the disadvantage of the resin-based systems could be overcome by using a mixture of organo-alkoxy siloxanes with a different degree of condensation. These substances are, however, still based on solutions in organic solvents.

An aqueous preparation is disclosed in DE 3 911 479, which comprises a silicon resin together with an alkyl alkoxy silane and a solid with defined surface characteristics. Some of the disadvantages described above do not occur here. However, a problem is posed by the fact that the emulsion concerned additionally has solid particles, and this is not advantageous for the stability of the emulsion. Inadequate physical stability results in a slow hydrolysis and preliminary condensation with the above-mentioned problems. If—as is the case in the disclosed examples—the density of the building materials is relatively low, then serious shortcomings may not be directly ascertained.

If neutral building materials are to be protected at as early a stage as possible against the effects of moisture, then the addition of tin catalysts is recommended to improve effectiveness (Example 4). As is known to one skilled in the art, the addition of a catalyst is critical in so far as it greatly influences the potlife of the ready to use emulsion, which in turn leads to the above-described problems. Moreover, the addition of a catalyst in practice (e.g. on building sites) is carried out under difficult conditions, which results in a higher error rate. It must be noted here that impregnation errors must be avoided at all costs, since they are not immediately recognizable in the majority of cases and therefore may possibly lead to not inconsiderable damage.

None of the named prior publications is concerned with the physical properties of aqueous emulsions used as waterproofing agents.

In the experiments forming the basis of the present invention it was found that it was possible considerably to improve the known waterproofing agents for mineral substances based on aqueous emulsions of silanes and/or siloxane resins, each containing reactive groups, if the dimensions of the emulsified particles and/or droplets lie within a specific, narrowly defined range of magnitude and have a narrow range of particle size. The determined improvement in properties relates to the entire spectrum of properties of importance to such waterproofing agents.

The spectrum of properties includes the stability of the emulsions both in concentrated form and after dilution to the concentration of the application, as well as the hydrophobic effect, i.e. both with respect to the penetration depth of the emulsion prior to hydrolysis and/or condensation, the early water resistance and resistance to water absorption from impregnated mineral building materials.

The known waterproofing agents each constitute a balance with respect to a specific purpose (application in alkaline or neutral mineral building materials, in building materials with higher or lower porosity, in areas with a damp or dry climate, or an evaporation-promoting sunny climate, or a cool climate less favorable to evaporation, and cloudy areas), whereby disadvantages in properties with less serious consequences with respect to the specific purpose of application must be accepted. If such waterproofing agents are provided with the particle size and range according to the invention, the disadvantages accepted hitherto will be reduced, so that their range of use is extended. The range of use may be extended, for example, if use of a catalyst is superfluous, thus increasing the storage stability, or the application of emulsifiers and emulsion stabilizers may be reduced, thus improving the early resistance of the impregnation to rain. Other waterproofing agents suitable for highly porous mineral building materials may also be used for finely porous building materials, if provided with the particle size and range according to the invention.

Apart from the fact that fine-particle emulsions with a narrow range of particle size are generally more stable against coagulation and segregation, there is obviously also a positive influence on the diffusion behavior in the building material as well as the hydrolysis behavior of the silanes and/or the condensation behavior of the siloxane resins.

SUMMARY OF THE INVENTION

In a preferred embodiment, the present invention relates to emulsions of special reactive silanes and siloxane resins, which are suitable as universal waterproofing agent for both neutral and alkaline, finely porous and highly porous, mineral building materials and have a high storage stability as well as low tendency to evaporation after application.

PREFERRED EMBODIMENT OF THE INVENTION

The present invention provides waterproofing agents for mineral building materials based on aqueous emulsions of organo-silanes and/or organo-siloxane resins containing reactive groups, which are characterized in that the dispersed phase comprises average particle or droplet diameters of about 0.30 to 1.1 µm and a scope of particle or droplet size range of less than about 1.3, preferably less than about 1.1.

The average particle diameter should be understood to refer to the mean volume, i.e. the calculated diameter of a particle resulting from the total volume of all particles in the emulsion divided by the number of particles.

The numerical value of the scope of the particle size range is calculated so that of the given particle quantity, the particles with the smallest diameters up to a quantity of about 10 wt. % of the particle quantity (D10) and the particles with the largest diameters up to a quantity of about 10 wt. % of the particle quantity (D90) are not considered, and the difference in diameter of the largest remaining particle and the smallest remaining particle is divided by the diameter of the particle (D50), which is larger than 50 wt. % of all particles and smaller than 50 wt. % of all particles. This numerical value is referred to below as U90. (see FIG. 1)

The narrow range of particle size is preferably produced in emulsifying apparatuses, in which a preliminary emulsion, which is not subject to special requirements, is pressed under high pressure through a nozzle with small dimensions in at least one dimension. Suitable nozzles are slotted nozzles, ring slot nozzles or hole-type nozzles. The small dimension (slot width, ring slot width, hole diameter) may amount to approximately 0.2 to 1 mm. The dimensions of the nozzle in the direction of flow may amount to about 1.5 times to twice the dimensions of the small dimension. The pressure to be applied may typically amount to about 3 to 15 MPa (30 to 150 atmospheres). Apparatuses of this type are known in the form of jet dispersers or high-pressure homogenizers. Use of a jet disperser according to EP-A-101 007 is particularly preferred.

In order to set the particle size range according to the invention, it is necessary to simply press the emulsion several times through the nozzle or to use apparatuses with several nozzles arranged one behind the other, whereby an elevated pressure corresponding to the number of nozzles must be applied.

It was found that passage through the nozzles two to about six-times is sufficient in the case of the jet disperser. In the high-pressure homogenizer, which has a ring slot nozzle, passage through the nozzle about 5 to 10 times is necessary. Several nozzles are preferably arranged one behind the other and the total pressure is adapted accordingly.

The water contents of the dispersions according to the invention lie between about 30 and 95 wt. %, whereby a preliminary dispersion with a water content of about 30 to 50 wt. % is generally used for dispersal. The dilution to the application concentration with a water content of about 80 to 95 wt. % is generally carried out by the user just prior to application.

Preferred emulsions according to the invention are obtained from preparations containing about 5 to 70 wt. % of a mixture, in which the ratio of alkyl alkoxyl silane (I, Ia) to alkyl alkoxyl siloxane (II) ranges from about 0.5:1 to 0.98:1 at maximum, wherein the alkoxy alkyl silane has the general formula $$R^1\text{—Si}(OR^2)_3 \qquad (I)$$

or $$CH_3R^1Si(OR^2)_2 \qquad (Ia)$$

or mixtures thereof, in which $R^1$ is an alkyl radical with 3 to 18 C atoms, preferably 8 to 16 C atoms, and $R^2$ is an alkyl radical with 1 or 2 C atoms, and wherein the alkyl alkoxy siloxane has the general formula $$(CH_3)_x R^3_y\text{—Si}(OR^2)_z(O)_{(4-x-y-z)/2} \qquad (II)$$

in which $R^2$ is an alkyl radical with 1 or 2 C atoms, $R^3$ is an alkyl radical with 3 to 18 C atoms, $x+y$ has a value of 0.75 to 1.5, wherein $y$ has a value greater than 0.1 and $z$ has a value of 0.2 to 2.0, and has a viscosity of about 2 to 2000 mPa.s, and which contains about 0.01 to 3.5% emulsifier and about 30 to 95% water, the pH value having an alkaline value.

The alkyl alkoxy silanes of the formula (I) or (Ia) are known products. Examples of the corresponding alkyl radicals are the butyl, hexyl, octyl, nonyl, decyl, dodecyl, tetradecyl, hexadecyl and octadecyl radicals. Radicals, which are not cross-linked, such as the butyl, octyl and dodecyl radicals, are preferred.

The alkoxy radicals are composed of methoxy and/or ethoxy radical, the ethoxy residue being preferred on ecological grounds.

The alkoxy alkyl siloxanes of the formula (II) are known in principle (e.g. from EP-A-157 323 or DE-A-34 12 941). Examples of the alkyl radicals are the methyl, propyl, butyl, hexyl, dodecyl, tetradecyl, hexadecyl and the octadecyl radicals. Examples of the alkoxy radicals are methoxy and/or ethoxy radicals, the former being preferred for reasons of reactivity. The concept alkyl alkoxy siloxane may in principle also cover a mixture so long as the overall composition corresponds to the above formula.

Preferred $R^3$ residues are alkyl radicals with 8 to 16 C atoms, particularly the $C_{12}$ alkyl radical.

The emulsifiers to be used are those which are generally available commercially. Examples of these are ethylene oxide adducts to fatty alcohols or alkyl phenols, polyethylene oxide sorbitan laurates and triglycerides, the HLB value of which lies between 10 and 16.

The pH value may be adjusted by means of salts and buffer salts such as carbonates and borates, acetates or by means of amines. Ammono-alcohols are preferred. The preferred pH value lies around 7.5, in particular between 7.3 and 7.8.

The highly concentrated emulsion shows a stability extending over several months and is preferably diluted to a working concentration with approximately 5% to 8% active substance. The diluted form (working concentration) remains stable over several weeks.

DESCRIPTION OF THE DRAWING

The invention is explained in more detail in the drawing and the following examples:

In the drawing, the figure shows the differential and integral particle size ranges for Emulsion B2.

1. Manufacture of the Emulsions

Figure 1:
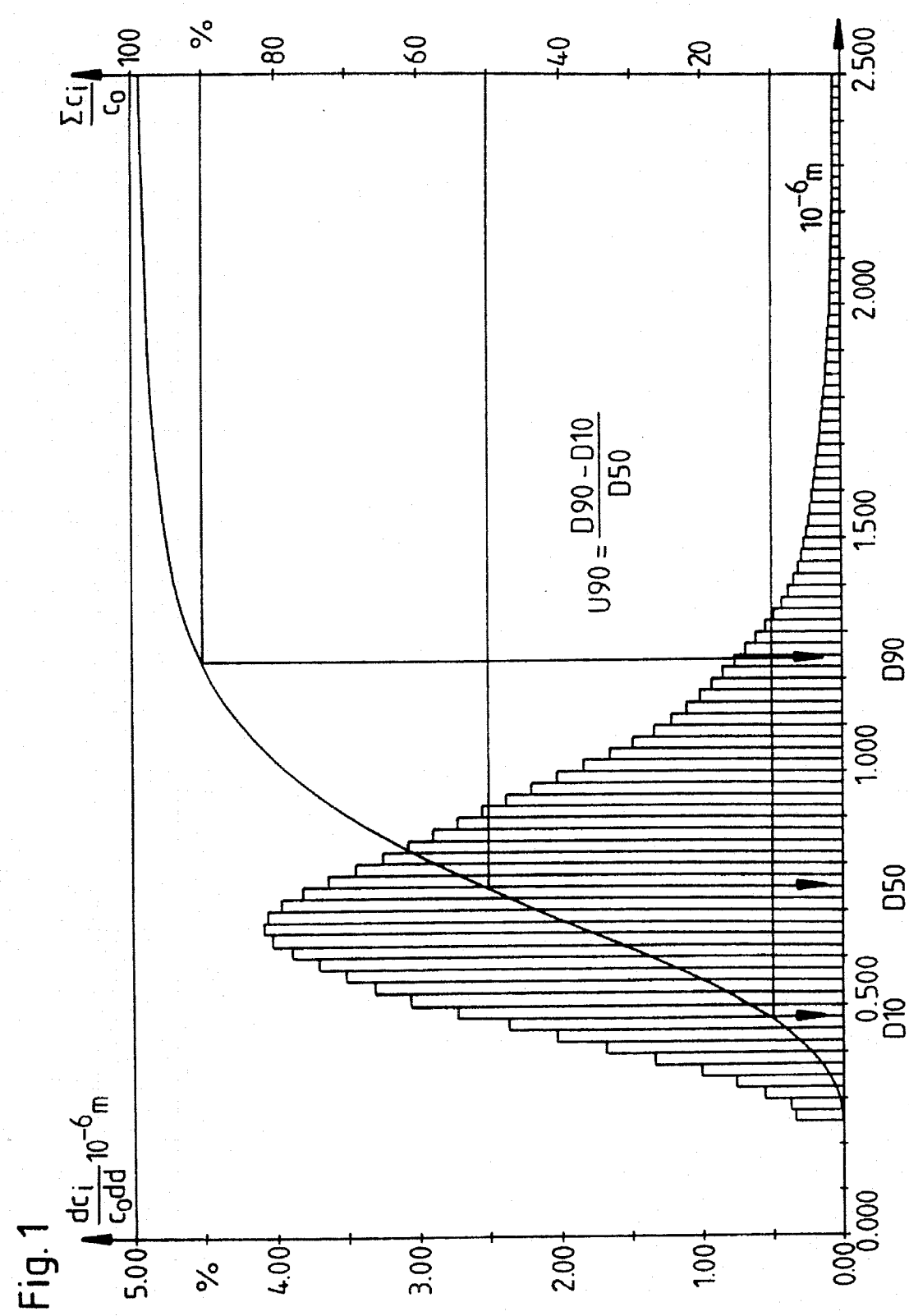

1.1 Emulsion A 61.81 wt. % of a mixture of 0.97 parts by weight of octyltriethoxy-silane and 1 part by weight of a resin of average composition $$(CH_3)_{0.8}(C_{12}H_{25})_{0.2}Si(O)_1(OCH_3)_1$$

are dispersed with 1.00 wt. % of a mixture of two adducts of ethylene oxide to alkanol with an HLB value of 10, in the presence of 0.1 wt. % of ethanol amine and 37.09 wt. % of water at 200 bar in jet disperser with 2 nozzles arranged one behind the other (100 bar per nozzle), being passed through once. The average particle size amounts to 0.91 μm and the particle size range U90=1.095.

1.2 Emulsion B1

The above mixture of active substances was emulsified with 1.00 wt. % of a mixture of ethylene oxide adduct of a fatty alcohol and a polyethylene oxide sorbitan laurate with an HLB value of 15, as described above. The average particle size amounts to 0.89 μm, the particle size range U90=1.090.

Emulsion B2

The emulsion B1 was once again passed through the jet disperser. The average particle size amounts to 0.834 μm, the range U90=1.013.

The drawing shows the differential and integral particle size range.

1.3 Emulsion C 61.81 wt. % of a mixture of 0.97 parts by weight of octyltriethoxy-silane and 1 part by weight of a hydrolyzate composed of 20 mol % of isobutyl and 80 mol % of methyl siloxy groups, containing approximately 20 wt. % methoxy residues were emulsified as in Example B2. The average particle size amounts to 0,842 μm, the range U90=1.021.

1.4 Emulsion D

Example 1.3 was repeated with a resin component containing exclusively ethoxy groups in place of methoxy groups. The average particle size amounts to 0.87 μm, the range U90=1.018.

1.5 Emulsion E1 (Comparison)

Example 1.2 was repeated. However, emulsification took place in a high-pressure homogenizer at 100 bar, the emulsion being passed through twice consecutively. The average particle size amounts to 1.222 μm, the range U90=2.114.

Emulsion E2

Emulsion E2 was passed a further 6 times through the high-pressure homogenizer. The average particle size amounts to 0.9386 μm, the range U90=1.229.

1.6 Emulsion F

Example 1.2 was repeated, except 50% of the octytriethoxy-silane was replaced by methyl-dodecyl-dimethoxysilane. The average particle size amounts to 0.854 μm, the range U90=1.031.

1.7 Emulsion G (Not Preferred)

Example 1.2 was repeated. However, an ethoxy polysiloxane resin with methyl groups was used of the formula $$CH_3(C_2H_5O)_{0.2}SiO_{1.4}$$

The average particle size amounts to 0.87 μm, the range U90=1.029.

1.8 Emulsion H (Comparison)

A silane emulsion according to Example 1 of EP-A-340 816 was manufactured.

1.9 Emulsion J (Comparison)

A solution of a hydrolyzate composed of 20 mol % of isobutyl and 80 mol % of methyl siloxy groups, which still contained approximately 20 wt. % methoxy residues, was manufactured in crystal oil 30, a solvent from Shell AG containing aliphatic and aromatic components.

2. Application Examples

2.1

Emulsion B2 manufactured according to Example 1.2 was tested for impregnation of concrete. Concrete slabs were used with dimensions 10×10×5 cm. The samples produced from cement, sand and coarse grain material had a water/cement factor of 0.45 and corresponded to the quality requirements of B35. The slabs were sealed on 5 sides with a thixotropic epoxy coating. The remaining abraded side was lightly treated with a heavily diluted hydrochloric acid, thus removing the layer of adhering cement dust.

Before impregnation, the concrete slabs were stored so that the absorbed humidity corresponded to 70% or 45% of the saturation. The impregnating agent was applied with a paintbrush after various dilutions and was restricted to 0.3 l/m² of concrete surface by controlling the quantity absorbed.

The water absorbed by the impregnated concrete on being stored vertically in water at an immersion depth of 10 cm, and the penetration depth after the samples were broken, were determined after a pertinent drying time in the laboratory at a room temperature of approximately 23° C. The results are shown in Tables 1 and 2.

2.2

The manufactured emulsions were used in two application concentrations (I=12.5%, II=9.1%) to impregnate different building materials.

Sections of bricks and chalky sandstone with dimensions 6×5×1.5 cm were used as building materials.

In addition, round discs of limestone cement plaster and of highly compressed cement mortar with a diameter of 6 cm and a thickness of 1.2 cm were used. Impregnation was carried out by immersing the building material samples once in the impregnating emulsion for 30 seconds.

After storing for 7 days on grilles at a room temperature of approximately 23° C., the effects were evaluated.

The following criteria were applied in evaluation:

a) penetration depth b) surface hydrophobia c) capillary water absorption with a penetration depth of 3 mm The surface hydrophobia was evaluated according to the following criteria:

s=sucking action ss=weak sucking action stb=heavy wetting action b=wetting action h-b=hydrophobic wetting action h=hydrophobic The results are shown in Tables 3 to 6.

TABLE 1

Concrete samples with 70% moisture saturation

| EMULSION | % ACTIVE SUBSTANCE | PENETRATION DEPTH [mm] | WATER ABSORPTION IN wt. % 1 day | 5 days |
|---|---|---|---|---|
| B2 | 4.2 | 2.5 | 0.12 | 0.23 |
| B2 | 6.6 | 4.2 | 0.06 | 0.12 |
| B2 | 9.0 | 4.3 | 0.05 | 0.14 |
| B2 | 11.4 | 4.3 | 0.05 | 0.11 |
| Zero sample | — | — | 1.75 | 2.15 |
| H | 20.0 | 4.0 | 0.17 | 0.44 |
| J | 15.0 | 3.3 | 0.07 | 0.12 |
| J | 7.5 | 4.0 | 0.07 | 0.13 |

TABLE 2

Concrete samples with 45% moisture saturation

| EMULSION | % ACTIVE SUBSTANCE | PENETRATION DEPTH [mm] | WATER ABSORPTION IN wt. % 1 day | 5 days |
|---|---|---|---|---|
| B2 | 4.2 | 1.3 | 0.14 | 0.23 |
| B2 | 6.6 | 2.0 | 0.11 | 0.16 |
| B2 | 9.0 | 3.8 | 0.11 | 0.16 |
| B2 | 11.4 | 3.3 | 0.10 | 0.14 |
| Zero sample | — | — | 1.68 | 2.34 |
| H | 20.0 | 3.3 | 0.18 | 0.28 |
| J | 15.0 | 3.9 | 0.07 | 0.15 |
| J | 7.5 | 3.9 | 0.09 | 0.15 |

TABLE 3

Bricks

| EMULSION | PENETRATION DEPTH [mm] | SURFACE HYDRO- PHOBIA | % CAPILLARY WATER ABSORPTION 2 h | 6 h | 24 h |
|---|---|---|---|---|---|
| A I | 5–7 | st b | 0.6 | 0.7 | 0.8 |
| B2 I | 6–7 | h-b | 0.4 | 0.5 | 0.7 |
| C I | 5–7 | h-b | 0.4 | 0.4 | 0.5 |
| D I | 7–10 | ss | 0.6 | 0.6 | 0.7 |
| E2 I | 5–7 | st b | 0.5 | 0.7 | 0.7 |
| F I | 5–6 | st b | 0.6 | 0.7 | 0.7 |
| G I | >5 | ss | 1.1 | 1.5 | 10.3 |
| A II | 6–7 | st b | 0.5 | 0.5 | 0.6 |
| B2 II | 6–7 | h-b | 0.6 | 0.7 | 0.8 |
| C II | 4–5 | h-b | 0.5 | 0.5 | 0.7 |
| D II | 5–6 | ss | 0.6 | 0.6 | 0.8 |
| E2 II | 5–7 | st b | 0.5 | 0.6 | 0.7 |
| F II | 3–5 | st b | 0.5 | 0.5 | 0.7 |
| Zero Sample | U | s | 9.8 | 10.0 | 10.4 |

TABLE 4

Chalky Sandstone

| EMULSION | PENETRATION DEPTH [mm] | SURFACE HYDRO- PHOBIA | % CAPILLARY WATER ABSORPTION 2 h | 6 h | 24 h |
|---|---|---|---|---|---|
| A I | 1–2 | b | 0.3 | 0.4 | 0.7 |
| B2 I | 2 | b | 0.3 | 0.4 | 0.7 |
| C I | 2 | b | 0.3 | 0.4 | 0.7 |
| D I | 2 | st b | 0.3 | 0.5 | 0.8 |
| E2 I | 1–2 | b | 0.3 | 0.4 | 0.6 |
| F I | 2 | b | 0.3 | 0.4 | 0.8 |
| G I | 1 | st b | 0.4 | 0.7 | 1.1 |
| A II | 1 | b | 0.2 | 0.4 | 0.6 |
| B2 II | 1–2 | b | 0.2 | 0.4 | 0.6 |
| C II | 1 | b | 0.2 | 0.4 | 0.7 |
| D II | 1 | st b | 0.3 | 0.6 | 1.1 |
| E2 II | 1–2 | b | 0.3 | 0.4 | 0.7 |
| F II | 1 | b | 0.6 | 0.7 | 1.0 |
| Zero Sample | 0 | s | 10.1 | 10.2 | 10.3 |

TABLE 5

Limestone Cement Plaster

| EMULSION | PENETRATION DEPTH [mm] | SURFACE HYDRO- PHOBIA | % CAPILLARY WATER ABSORPTION 2 h | 6 h | 24 h |
|---|---|---|---|---|---|
| A I | 3–4 | st b | 0.6 | 0.7 | 0.8 |
| B2 I | 3–4 | st b | 0.5 | 0.7 | 0.7 |
| C I | 2–3 | st b | 0.4 | 0.4 | 0.5 |
| D I | 3–4 | st b | 0.6 | 0.6 | 0.7 |
| E2 I | 3–4 | st b | 0.5 | 0.7 | 0.7 |
| F I | 3–4 | st b | 0.6 | 0.7 | 0.7 |
| G I | 2–3 | st b | 0.5 | 0.5 | 0.8 |
| A II | 2–3 | st b | 0.6 | 0.7 | 0.7 |
| B2 II | 2–3 | st b | 0.5 | 0.5 | 0.6 |
| C II | 2–3 | st b | 0.5 | 0.5 | 0.7 |
| D II | 2–4 | st b | 0.6 | 0.6 | 0.8 |
| E2 II | 2–3 | st b | 0.5 | 0.6 | 0.7 |
| F II | 2–4 | st b | 0.5 | 0.5 | 0.7 |
| Zero Sample | 0 | s | 10.5 | 10.8 | 10.8 |

TABLE 6

Cement Mortar

| EMULSION | PENETRATION DEPTH [mm] | SURFACE HYDRO- PHOBIA | % CAPILLARY WATER ABSORPTION 2 h | 6 h | 24 h |
|---|---|---|---|---|---|
| A I | 1 | st b* | 0.3 | 0.5 | 0.7 |
| B2 I | 1 | b | 0.3 | 0.4 | 0.5 |
| C I | 1 | h-b | 0.2 | 0.3 | 0.5 |
| D I | 0.5 | st b | 0.4 | 0.6 | 0.8 |
| E2 I | 1 | st b | 0.3 | 0.4 | 0.6 |
| F I | 1 | st b | 0.3 | 0.4 | 0.7 |
| G I | 0.5 | st b | 0.5 | 0.6 | 1.1 |
| A II | 0.5–1 | st b | 0.4 | 0.5 | 0.8 |
| B2 II | 0.5–1 | b | 0.5 | 0.6 | 0.8 |
| C II | 0.5 | h-b | 0.2 | 0.4 | 0.5 |
| C II | 0.5 | st b | 0.5 | 0.8 | 1.1 |
| E2 II | 0.5 | st b | 0.3 | 0.5 | 0.7 |
| F II | 0.5 | st b | 0.3 | 0.4 | 0.8 |
| Zero Sample | 0 | s | 3.8 | 4.2 | 4.2 |

TABLE 6-continued

| | Cement Mortar | | | | |
|---|---|---|---|---|---|
| | PENETRA-TION DEPTH | SURFACE HYDRO- | % CAPILLARY WATER ABSORPTION | | |
| EMULSION | [mm] | PHOBIA | 2 h | 6 h | 24 h |

It is understood that the specification and examples are illustrative but not limitative of the present invention and that other embodiments within the spirit and scope of the invention will suggest themselves to those skilled in the art.

We claim:

1. A waterproofing agent for mineral building materials comprising an aqueous emulsion of dispersed organosilanes, organosiloxane resins, or both, wherein the disperse phase has an average particle size of about 0.3 to 1.1 µm and a scope of particle size range of less than about 1.3, and wherein the emulsion contains about 5 to 70 wt. % of a mixture of alkyl alkoxyl silane and alkyl alkoxy siloxane in which the ratio of alkyl alkoxy silane to alkyl alkoxy siloxane ranges from about 0.5:1 to 0.98:1 at maximum, and wherein the alkoxy alkyl silane is of the formula $$R^1\!-\!Si(OR^2)_3 \tag{I}$$

or $$CH_3R^1Si(OR^2)_2 \tag{Ia}$$

or mixtures thereof, in which $R^1$ is an alkyl radical with 3 to 18 C atoms, and $R^2$ is an alkyl radical with 1 to 2 C atoms, and wherein the alkyl alkoxy siloxane is of the formula $$(CH_3)_xR^3{}_y\!-\!Si(OR^2)_z(O)_{(4-x-y-z)/2} \tag{II}$$

which $R^2$ is an alkyl radical with 1 or 2 C atoms, $R^3$ is an alkyl radical with 3 to 18 C atoms, x+y has a value of about 0.75 to 1.5, wherein y has a value greater than 0.1 and z has a value of about 0.2 to 2.0, and has a viscosity of 2 to 2000 mPa.s, and which contains about 0.01 to 3.5% emulsifier and about 30 to 95% water, and an alkaline pH.

2. A waterproofing agent according to claim 1, wherein the alkoxy alkyl siloxane component contains methoxy radicals.

3. A waterproofing agent according to claim 1, wherein $R^3$ has from 4 to 18 C atoms.

4. A waterproofing agent according to claim 1, wherein $R^3$ has from 8 to 12 C atoms.

5. A process for the manufacture of a waterproofing agent according to claim 1, comprising passing a preliminary emulsion from 2 to about 10 times through a nozzle with small dimensions in at least one dimension under a pressure of about 30 to 150 atmospheres.

* * * * *